(12) United States Patent
Paskalov et al.

(10) Patent No.: US 8,754,001 B2
(45) Date of Patent: Jun. 17, 2014

(54) SELF SUSTAINED SYSTEM FOR SORBENT PRODUCTION

(75) Inventors: George Paskalov, Torrance, CA (US); Ildar Gafarov, Moscow (RU)

(73) Assignee: Applied Energy Microsystem Asia PTE Ltd., Singapore (SG)

(*) Notice: Subject to any disclaimer, the term of this patent is extended or adjusted under 35 U.S.C. 154(b) by 0 days.

(21) Appl. No.: 13/135,792

(22) Filed: Jul. 15, 2011

(65) Prior Publication Data

US 2013/0136683 A1    May 30, 2013

Related U.S. Application Data

(60) Provisional application No. 61/400,825, filed on Aug. 4, 2010.

(51) Int. Cl.
*B01J 20/20* (2006.01)
(52) U.S. Cl.
USPC ............ 502/413; 502/400; 502/416; 252/502
(58) Field of Classification Search
USPC .................. 422/129, 462, 906; 502/400-438
See application file for complete search history.

(56) References Cited

U.S. PATENT DOCUMENTS 6,987,792 B2    1/2006    Do
7,752,983 B2    7/2010    Vera

OTHER PUBLICATIONS

H. Huang, L. Tang, Pyrolysis treatment of waste tire powder in a capacitively coupled RF plasma reactor, Energy Conversion and Management, vol. 50, Issue 3, Mar. 2009, pp. 611-617, ISSN 0196-8904, 10.1016/j.enconman.2008.10.023. (http://www.sciencedirect.com/science/article/pii/S0196890408004263).*
Synthesis gas definition. The Free Dictionary. <http://www.thefreedictionary.com/Syngas> Accessed May 9, 2013.*
Joachim Heberlein and Anthony B Murphy. J. Phys. D: Appl. Phys. 41 (2008) 053001 (20pp).*
Chang, J. "Thermal Plasma Solid Waste and Water Treatments: A Critical Review". International Journal of Plasma Environmental Science and Technology vol. 3, No. 2, Sep. 2009.*
Zengli Zhao, Haitao Huang, Chuangzhi, Haibin Li, and Yong Chen. "Biomass Pyrolysis in an Argon/Hydrogen Plasma Reactor" Engineering in Life SciencesVolume 1, Issue 5, Article first published online: Oct. 30, 2001.*

(Continued)

*Primary Examiner* — Stanley Silverman
*Assistant Examiner* — Richard M Rump
(74) *Attorney, Agent, or Firm* — Fish & Tsang LLP

(57) ABSTRACT

A self sustained system for sorbent production includes a thermal reactor for pyrolytic decomposing organic waste material in order to generate synthetic gases and sorbents; sorbent and gas separation unit; gas cleaning unit and gas turbine, supplying energy back to the system. Rice husk is fed continuously into a thermal reactor at a controlled feed rate. The plasma torch is used to heat the reactor to a sufficient temperature, as to convert the rice husk 'feed' material to a synthetic gas and solid carbon rich sorbent. Oxygen and steam are added in control quantities to optimize efficiency of production of synthetic gas composition and sorbent quality. The synthetic gas is directed through a heat exchanger, where heat is extracted for producing the process steam. Cooled synthetic gas is used to power a gas turbine as a fuel to produce electricity. In one embodiment the waste material is a rice husk. The sorbent(s) can be applied to oil/water separation process and can absorb oil 5 to 10 times its own weight. The sorbent(s) can be re-used after extracting absorbed oil. The sorbent is also effective for waste water cleaning and filtering heavy metals.

15 Claims, 1 Drawing Sheet

Block diagram of a self-sustained system for sorbent production

(56) References Cited

OTHER PUBLICATIONS

Givi, Contribution of Rice Husk Ash to the Properties of Mortar and Concrete: A Review; Journal of American Science, 2010, pp. 157-165, 6(3).

Natarajan, E. et al, Pyrolysis of Rice Husk in a Fixed Bed Reactor, World Academy of Science, Engineering and Technology, 2009, pp. 504-508, 32.

Natarajan, E. et al, Overview of Combustion and Gasification of Rice Husk in Fluidized Bed Reactors, Biomass and Bioenergy, 1998, pp. 533-546, vol. 14, Nos. 5/6.

Wannapeera, Janewit et al, Product yields and characteristics of rice husk, rice straw and corncob during fast pyrolysis in a drop-tube/fixed-bed reactor, Songklanakarin Journal of Science and Technology, May-Jun. 2008, pp. 393-405, 30(3).

Jain, Anil, Design Parameters for a Rice Husk Throatless Gasifier Reactor, Agricultural Engineering International: the CIGR EJournal, Manuscript EE, May 2006, pp. 1-13, vol. VIII.

* cited by examiner

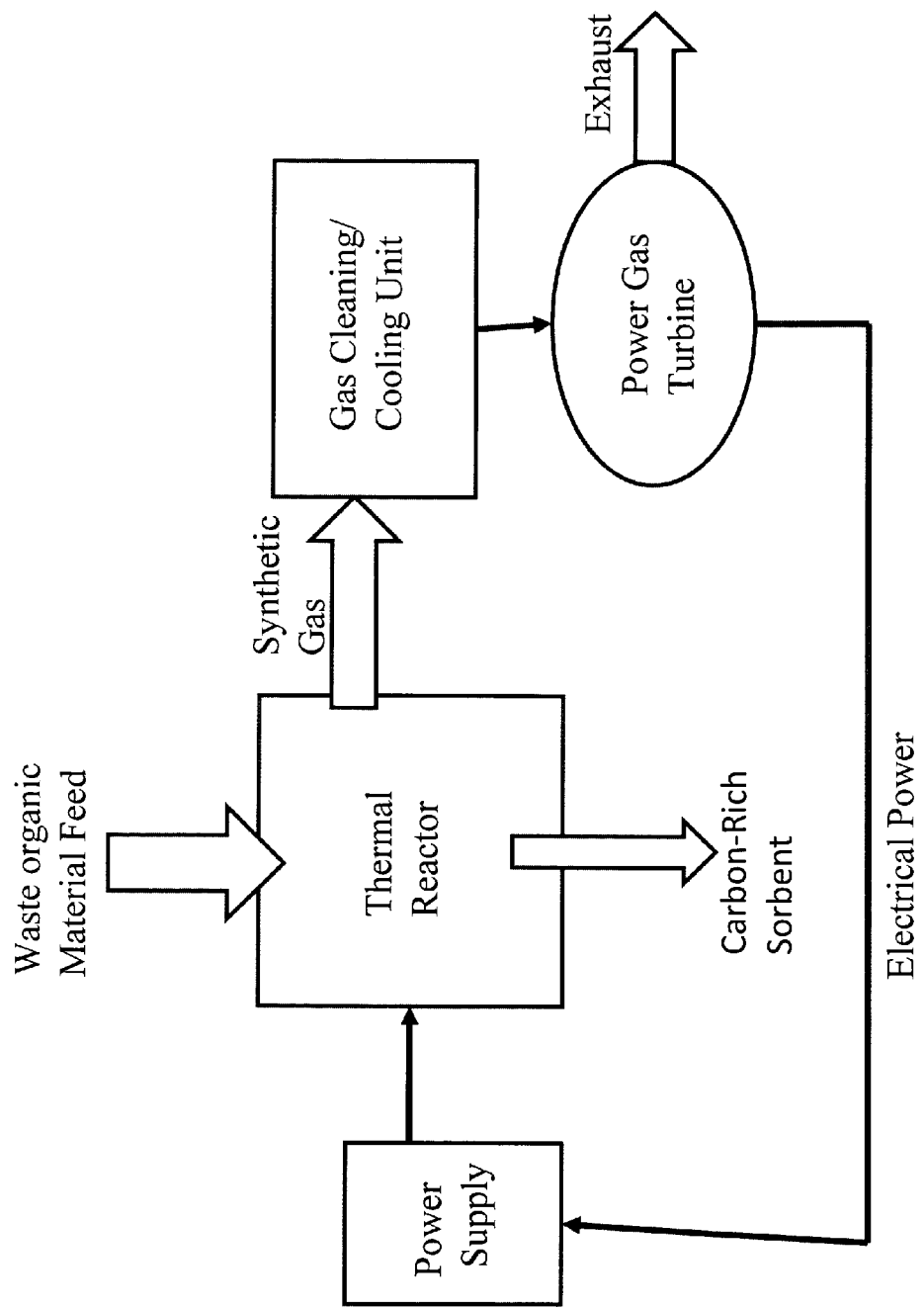

SELF SUSTAINED SYSTEM FOR SORBENT PRODUCTION

CROSS-REFERENCES TO RELATED APPLICATION

This application claims the priority benefit of U.S. Provisional Application Ser. No. 61/400,825 filed Aug. 4, 2010.

FIELD OF THE INVENTION

This invention relates to a system for carbon based sorbent production from organic waste, particular rice husk, by means of gasification and pyrolysis utilizing thermal and plasma heating technology.

BACKGROUND OF THE INVENTION

Approximately 50% of rice husk is now recycled into various by-products and while a significant number, there still exist unused. A special rice husk combustion unit generates steam and the rice husk ash is separated in hoppers. It is well known that rice husk content a high concentration of silica, generally more than 22%, and is unusually high in ash, which is more than 90% wt. Silica. This makes difficulties to use rice husk in combustion process in order to generate heat efficiently. Rice husk is also used as a fuel for boiling brine to produce NaCl salt, but its residue is costly to dispose of. The rice husk ash and rice husk blended with a Portland cement used to improve the quality of brine and bitters. The non-crystalline silica and high specific surface area of the rice husk ash are responsible for its high pozzolanic reactivity and has been used in lime-pozzolana mixes and could be a suitable partly replacement for Portland cement [1]. The rice husk can be converted to a useful form of energy. For example, the rice husk pyrolysis has been conducted in a fixed bed reactor [2]. Pyrolysis experiments were performed at temperature between 400 and 600 C. The goal was to obtain the highest liquid yield of 31.78% wt. at pyrolysis temperature 500 C and particle size 1.18 to 1.80 mm. Combustion and gasification of rice husk in fluidized bed reactors [3] is inefficient or unsuitable for energy conversion due to high ash content, low bulk density, poor flow characteristics and low ash melting point. Typically under the best operating conditions the gasification efficiency is around 65%. Few different methods exist for preparation of powdered activated carbon from rice husk [4, 5]. A drop-tube/fixed-bed reactor [4] experimental data show that rice husk containing a relatively high lignin content, had the lowest pyrolysis rate. Ash content was about 17.9% wt. Open core throat-less batch fed rice husk gasifier reactors was study for gasification efficiency and scaling factors [5]. The parameters of the process were optimized specifically for this type of reactor. Most of the plasma gasification systems are based on arc plasma discharge [6, 7]. Disadvantage of this type of plasma system are: short life of electrodes due to erosion; high temperature non-uniform plasma arc, which makes difficulties to control process temperature; low efficiency for in-flight powder treatment. A continuing need exist for a system by which the rice husk could be effectively convert into absorbent and the generated synthetic gas could be used for powering the system. This objective is achieved by using the thermal heating of rice husk in gas plasma contained atmosphere, precipitating a solid material resulting from pyrolytic reaction; cooling the interaction product: sorbent and synthetic gas; collecting the solid product; and using the synthetic gas for power generation for the system or for direct heating of the reactor by combustion of the synthetic gas.

In a presently preferred form of the invention, the rice husk is introduced into the plasma discharge in a flow of carrier gas. The plasma discharge is generated in a reactor chamber having a longitudinal axis between an inlet end and outlet end, and a plasma gas mixture circulates in the reactor chamber in a reciprocal flow pattern with a zone of substantially axial flow of the mixture in the chamber. The rice husk is preferably fed into the plasma discharge stream in or near this zone at a rate such that the rice husk will be completely carbonized and only solid and gas products will be generate. The plasma flow upstream of the plasma discharge is subjected to rapid cooling, which causes precipitation of solid component of the reaction products in the form of a fine carbon chips. The solid product (sorbent) is collected, but the gas product (synthetic gas) is transported to gas liquation unit for future use in gas turbine for power production. The system of this invention maybe carried out in an apparatus which includes a high frequency plasma torch of either the induction or capacitive type for generating a plasma discharge in oxygen free gas environment. A vortex generator mounted at an inlet of the plasma chamber introduces the plasma gas and creates the reciprocal flow pattern with the zone of axial flow of the plasma gas in the reactor. A quenching unit may take various forms. In a first form the quenching unit injects the coolant fluid into the plasma flow upstream of the plasma discharge. In a second form the quenching unit includes a cold surface disposed for collecting solid reaction product flowing from the outlet end of the reactor. This and other features and advantages of the improved plasma system for practicing the same will be better understood from the following detailed description.

BRIEF DESCRIPTION OF THE DRAWING

FIG. 1 is a block diagram of a self-sustained system for sorbent production.

DETAILED DESCRIPTION

Referring to FIG. 1, there is shown a block diagram of a self-sustained system for sorbent production, constructed in accordance with the present invention. The waste organic material enters the feeding system, which includes a feed conveyor and digital feeder (for example, K-Tron model 304 Dual Drive). The feeding system delivers waste organic material to the thermal reactor. A small amount of carrier gas is applied. Thermal reactor includes a thermal plasma torch, reactor itself, airlock valve, and container and off-gas exhaust pipe. RF plasma module includes a DC power supply, oscillator and plasma torch. The oscillator working frequency is in the range of 60 kHz to 40.68 MHz. The temperature within the plasma stream of the plasma torch is normally greater than 2700 C, typically at least 3900 C, and usually about 4800 to 5300 degrees C. range; with temperature in excess of about 6400 degrees C. being acceptable for usage in the inventive process and system. Plasma having temperature and uniform stream velocity profile effective for the present purpose maybe generated by any suitable radio-frequency plasma torch. The reaction pressure may vary widely and maybe sub-atmospheric, atmospheric or super atmospheric; typically atmospheric for ease operation. The waste organic material feed rate to the plasma stream is not a critical aspect of the inventive process and system. Typically and depending upon the particular torch being employed, the rate at which the waste organic material is introduced into plasma environment or stream, is generally in the range of from 100 kg/Hr to 1000 kg/Hr, usually between 200 to 500 kg/Hr. Depending upon the temperature of the plasma stream and waste organic material flow, the processing time of the waste organic material within plasma zone can be relatively short. Processing time is the time need it to heat the material up to 740 C. This temperature is enough to convert waste organic material into sorbent and efficiently generates synthetic gas from organic components. In general the higher the temperature the shorter he residence time; normally in the range of about $10^{-1}$ second to $10^{-5}$ second, typically $1\times10^{-2}$ to $2\times10^{-3}$ second. By employing suitable combinations of organic waste material feed rate, plasma temperature and processing time, the inventive process and system can be tailored to obtain optimal result. In other embodiment of the invention, a product, which was obtained by cooling or quenching of the processed waste organic material, can be separated into solid and gas components. By 'quenching" it meant that the plasma stream is cooled at rate of at least about $1\times10^3$ K/sec, e.g. from $1\times10^3$ to $1\times10^5$ K/sec. The plasma processed material is quenched by using the cold gas, atomized water or cold surface. The solid part of the processed material drops to the bottom of the reactor and moves to the container through the airlock valve. Off gas includes plasma gas and generated gas. The exhaust is directed to the gas cleaning/cooling unit. This unit preferably includes three filter stages: a continuous cleaning dust filter, a NEPA pre-filter, charcoal filter, wet scrubber and a heat exchanger. These filters remove particulates from the gas stream and cooled down the gas. The effectiveness of the various air control devices is preferably: for dust filter 90% removal of particles bigger than 10 microns; HEPA pre-filter 95%>5 micron; charcoal filter 99.999%>0.12 microns. Synthetic gas is directed to power gas turbine for power generation. The preferred waste organic material for sorbent production is rice husk. The sorbent, having highest efficiency, should have the organic matrix with multi-dimensional porous structure and with uniform distribution of mineral component and pores sizes from 2 to 35 micrometers (mcm). For example, the preferred pores size distribution is as follow: 2 to 20 mcm—63 to 66%; 20 to 30 mcm—26 to 37%; and 30 to 35 mcm—2 to 8%. Rice husk is a waste material from agriculture industry and only a portion of rice husk is recycled. This makes additional economical benefits. The properties described above could be obtained during the thermal plasma treatment. The process average temperature should be in the range of 520 to 740 C in order to maximize the quantity of the closed pores in the product. The closed pores are pores, which are not open for the other pores and are located in the middle of the absorbent. These closed pores substantially increase the sorption properties. The advantages of this sorbent are high absorption capacity, also due to creation of the right ratio between organic component and carbon, which is in the range of 1:18. Composition of the obtained sorbent is as follow: 92.5%—$SiO_2$; $K_2O$—4.1%; $P_2O_5$—0.8%; CaO—1.2%; other—1.4%. If the process temperature is higher than 740 C (as typical pyrolysis technologies are used) the full decomposition of the organic components of the rice husk could be achieved, which substantially decrease the absorption properties of the sorbent, because the absorption is due only to the carbon. In case of lower process temperature (less than 520 C) the micro-porous structure of the product does not have the right pores size distribution (see above) and the absorption properties of the product are substantially low. During the plasma pyrolysis of the rice husk the following components are generated: sorbent (product)—34% (includes 3% of carbon) and combustible gas 66% (include 48% of synthetic gas, 11% of methane). The metal species, as K, Ca, etc., which are abundant in rice husk, favors the formation of gas and solid product, while depressing the formation of liquid (oil). All combustible gas (average heating value is around 4 to 6 $MJ/m^3$) are transported to the gas cleaning unit and is used for power generation by gas turbine.

EXAMPLES

Example 1

A plasma discharge chamber having an inside diameter of 70 mm was provided. High voltage at a frequency 1.76 MHz with the input power 16 kW was supply to the inductive coil of the plasma torch. Argon was introduced into the discharge chamber through the vortex generator. Argon was used as a plasma gas only for start of plasma. After plasma was ignited the argon gas was replaced by portion of the combustion gas mixture from the pyrolysis process and a stable operating regime of the RF generator powering the plasma torch is maintained. The initial material—rice husk, was fed from the metering dispenser into the plasma jet, where it is subjected to temperatures in the order of 5000 degrees. The dwell time for rice husk is short enough in order to heat the material not higher than 740 C. The processing time is controlled by carrier gas flow and the velocity of the plasma jet. In this particular example, rice husk of 2 to 5 mm in size fed at the rate of 400 g/min. Carbonization of rice husk commenced in the plasma jet itself and was completed at the end of the stream. The quenching device was installed at this very point of the flow path just upstream of the point where sorbent was formed. The rapid cooling fixes the structure of the solid product, which is collected in suitable container. The combustion gas, generated during the heating of rice husk, was directed to the gas cleaning unit and gas collector. As a result of the plasma process the sorbents and synthetic gas were obtained. Average size of the solid product is about 0.1 to 0.5 mm. Total collected combustion gas product was 0.5 $m^3$/min. Typical heat value of the combustion gas is 5 $MJ/m^3$. Thus, we could generate at least 20 kW power by using gas turbine, having 40% efficiency. This power is enough to cover all power needs for the processing unit. Obtained sorbent has the following parameters: bulk density—0.13 $g/cm^3$; surface area—560 $m^2/g$. Absorbent picks 5 to 10 times its own weight in oil, without absorbing water. The absorbent flow on the top of water surface even if it is saturated with oil or other hazardous substances. In case of using for the waste water treatment, the sorbent is capable to decrease hydrocarbons contamination from 60 mg/l to 0.03 mg/l at flow 150 ml/min. The absorption time is 10 to 20 minutes.

Example 2

The plasma system was modified in order to generate capacitive plasma discharge. High voltage at frequency 13.56 MHz with a plasma discharge power was supplied to the external electrodes. Helium was used for pre-ionization and after plasma ignition was replaced by nitrogen. The power of the capacitive plasma discharge was established at 10 kW and the 3400 C average temperature of the plasma environment in the reactor was achieved. The dwell time for rice husk is similar to the induction plasma discharge, so the material was heat higher than 740 C. The processing time is controlled by carrier gas flow and the velocity of the plasma jet. In this particular example, rice husk of 2 to 5 mm in size fed at the rate of 250 g/min. Carbonization of rice husk commenced in the plasma jet itself and was completed at the end of the stream. The quenching device was installed at this very point of the flow path just upstream of the point where sorbent was formed. The rapid cooling fixes the structure of the solid product, which is collected in suitable container. The combustion gas, generated during the heating of rice husk, was directed to the gas cleaning unit and gas collector. As a result of the plasma process the sorbents and synthetic gas were obtained. Average size of the solid product is about 0.1 to 0.5 mm. Total collected combustion gas product was 0.31 m$^3$/min. Typical heat value of the combustion gas is 5 MJ/m$^3$. Thus, we could generate at least 13 kW power by using gas turbine, having 40% efficiency. This power is enough to cover all power needs for the processing unit. Obtained sorbent has the following parameters: bulk density—0.13 g/cm$^3$; surface area—560 m$^2$/g. Absorbent picks 5 to 10 times its own weight in oil, without absorbing water. The absorbent flow on the top of water surface even if it is saturated with oil or other hazardous substances. Experimental data (oil concentration after treatment, mg/l) related to the oil absorption is presented in the following table for different sorbent quantity (from 0.5 to 3.0 gr.) and different oil concentration (from 10 to 40 g/l):

| Oil Concentration, mg/l | Sorbent quantity, g | | | | |
| --- | --- | --- | --- | --- | --- |
| | 3.0 | 2.0 | 1.5 | 1.0 | 0.5 |
| 10 | n/a | 0.019 | 0.028 | 0.036 | 0.051 |
| 30 | 0.021 | 0.042 | 0.053 | 0.085 | 0.091 |
| 40 | 0.034 | 0.07 | 0.083 | n/a | n/a |

What is claimed is:

1. A self sustained method for sorbent production, comprising the steps of:
    generating high frequency plasma discharge in a gas mixture, said plasma discharge having a high temperature plasma jet and producing a flow of plasma upstream of said plasma discharge;
    introducing organic waste material into the plasma jet at a rate conductive to heating to desired temperature of said material in said plasma discharge by introducing a cooled probe into said plasma stream and introducing said organic waste material through said probe and adjusting the position of said probe within said plasma stream thereby to maximize the production rate;
    rapidly cooling the reaction products resulting from interaction of said organic waste material with said plasma stream;
    separating solid product from gaseous product;
    using the gaseous product for power generation for the said plasma discharge.

2. The method of claim 1 wherein thermal plasma is generated by induction plasma torch.

3. The method of claim 1 wherein non-thermal plasma is generated by capacitive plasma torch.

4. The method of claim 3 wherein source for plasma gas is the portion of the generated combustion gas mixture.

5. The method of claim 1 wherein said organic waste material is rice husk.

6. The method of claim 1 wherein said organic waste material is carried into said plasma in a flow of carrier gas.

7. The method of claim 6 wherein said carrier gas is nitrogen gas.

8. The method of claim 1 wherein said step of rapidly cooling product reaction comprises cooling by exposure to cold surface.

9. The method of claim 1 wherein said step of rapidly cooling product reaction comprises cooling by exposure of cold water.

10. The method of claim 1 wherein said step of rapidly cooling product reaction comprises cooling by exposure to cold gas.

11. The method of claim 1 wherein the plasma is generated in a cylindrical vessel comprising:
    (i) A plasma jet;
    (ii) A cooling zone downstream of said plasma jet adapted to cool the products;
    (iii) a container for collecting solid product from the vessel;
    (iv) a gas collector for collecting the gas product from the vessel.

12. The method of claim 11 wherein the cooling zone comprises a jacketed section of said vessel.

13. The method of claim 1 further comprising the step of cleaning the gas product.

14. The method of claim 1 wherein the gas product is used as a fuel for gas electric turbine.

15. The method of claim 12, further comprising the step of circulating cooling fluids through the jacketed section.

* * * * *